…

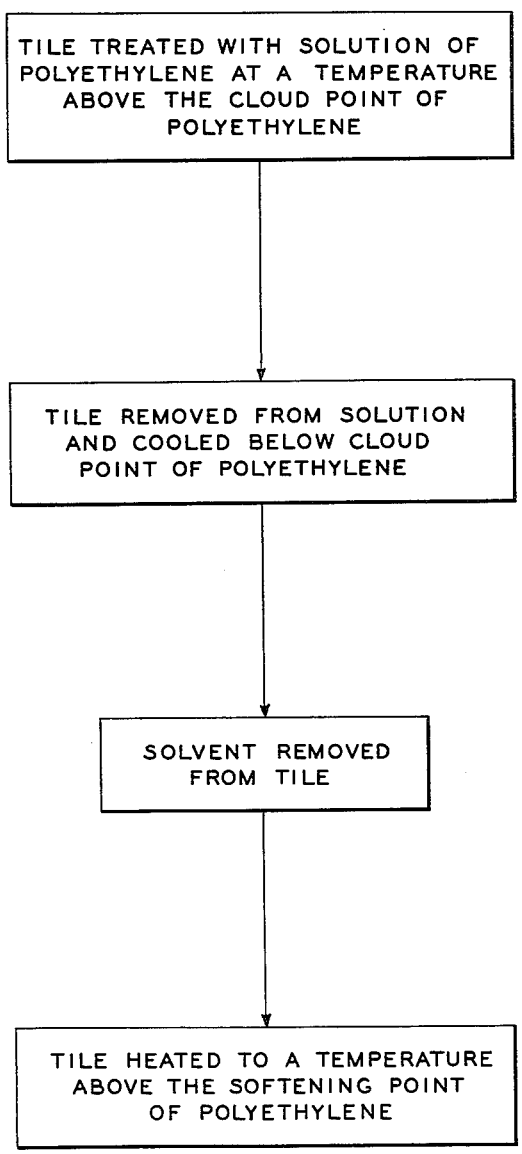

United States Patent Office 3,111,427
Patented Nov. 19, 1963

3,111,427
METHOD OF TREATING MASONRY MATERIALS
Herman B. Wagner, Blooming Glen, Pa., assignor to Tile Council of America, Inc., New York, N.Y., a corporation of New York
Filed Apr. 4, 1961, Ser. No. 100,491
7 Claims. (Cl. 117—102)

This invention relates to the treatment of ceramic tile and other masonry materials, such as gypsum wall board, brick, cinder block, porous concrete, and the like, and more particularly to an improved method of treating such materials to render them resistant to deterioration at low temperatures.

Although the following description will be directed to ceramic tiles, it is equally applicable to the other porous masonry materials mentioned hereinabove.

A large part of ceramic tile production, both foreign and domestic, is of the absorptive type. This means that a relatively large void space is present in the tile bisque, constituting from about 6 to as high as 40 percent of total volume. Commonly tiles having about 6 to 14 percent void volume are referred to as "semi-vitreous," while those having about 15 percent void volume are referred to as "absorptive."

Tiles in these categories have been found to perform poorly when used to face exteriors located in climates where freezing occurs. This is exhibited generally as spalling or cracking of the glaze and progressive deterioration of the tile bisque itself. The effect is believed to be caused by entry of water into the tile void space and its subsequent freezing, with concomitant expansion and pressure development within the tile. It is obvious that if this intrusion of water were prevented in the first place such failure would not occur.

In the past, it has been suggested to render the interior surface area of the bisque hydrophobic, as by impregnating the bisque with hydrophobic oils, or by exposing the bisques to vapors of hydrophobic materials. Silicone polymer oils and vapors of volatile silanes have been suggested for this purpose. These methods and materials, however, have proved ineffectual or impractical for one reason or another.

For example, the hydrophobic character imparted to the tile bisque by these prior art methods and materials extended also to the exterior surfaces, thereby making bonding with hydraulic cement mortars extremely difficult, if not impossible.

Moreover, the hydrophobicity imparted by these prior art methods and materials was of a temporary nature, a reversion to a hydrophilic condition occurring as the result of contact with the highly alkaline mortars, migration of the oil, or instability of the molecular surface films generated by the silanes and silicone oils.

According to the present invention, ceramic tile and other masonry materials of the type described hereinabove, have been rendered resistant to damage by freezing temperatures by treating the materials in a prescribed manner with a composition comprising polyethylene and a suitable solvent.

The method of the present invention will be made clear by reference to the drawing which is a flow sheet of the process.

In carrying out the method, a solution of polyethylene in a suitable solvent is prepared by dissolving the polyethylene in the solvent at a temperature above the "cloud point" of the polyethylene. The cloud point is the temperature at which the polyethylene begins to crystallize from the solution, e.g., above about 70° to 75° C. The tile, which may be preheated to the same temperature as the solution to prevent cooling of the solution, is then sprayed with, swathed with, or immersed in the solution, whereupon the air in the tile bisque is displaced by the solution. This may require between about 20 and 40 minutes or more, depending upon the method of application.

Following displacement of the air in the bisque by the polyethylene solution, the tile is removed from the solution and cooled below the cloud point of the polyethylene, e.g., below about 70° to 65° C., to precipitate particles of polyethylene. During cooling, the tile may be covered, or otherwise confined, or put under pressure, to prevent premature evaporation of the solvent prior to pricipitation of the polyethylene. After the tile has cooled below the polyethylene cloud point, the solvent is removed in a suitable manner.

Following solvent removal, the tile is heated to or above the softening point of the polyethylene, e.g., above 100° C., to effect flow of the polyethylene over the interior surface of the bisque.

Any commercially available polyethylene of the high, medium or low density type may be employed. The polyethylene preferably has a molecular weight of 2,000 or more, a viscosity at 140° C. of at least about 100 centipoises, and an ASTM E28–51T melting point of at least about 104° C., or between about 104° and 115° C.

Suitable solvents for use are volatile hydrocarbons and chlorinated hydrocarbons having the ability to dissolve polyethylene. Particularly suitable are volatile hydrocarbons and chlorinated hydrocarbons, particularly of the cyclic series, boiling between about 100° and 300° C., such as naphthalene, toluene, xylene, diphenyl, dibenzyl, paradichlorobenzene, and the dichloronaphthalenes. The solvents act simply as a carrier for the polyethylene, to insure penetration of the polyethylene into the pores of the bisque. With high boiling or low boiling solvents, the treatment of the bisque with the solvent solution may have to be conducted under vacuum, or pressure, respectively, to insure that the solvent remains liquid at the temperature of application, i.e., at temperatures above the cloud point of polyethylene, or stated differently, at temperatures above about 71° to 75° C. Accordingly, solvents having boiling points above or below those mentioned may be used, and in this event, the solution will have to be applied under pressure or vacuum, as appropriate. The volatile hydrocarbons or chlorinated hydrocarbons should, of course, have the ability to dissolve polyethylene in the liquid phase.

Polyethylene is permanently hydrophobic. When dissolved in the liquid solvent at temperatures above its cloud point, it flows into the pores of the bisque as a single liquid phase with the solvent. When the temperature is subsequently lowered to below the cloud point of the polyethylene, particles of hydrophobic polyethylene are precipitated and are entrapped within the void structure of the bisque. This then allows the now essentially one-hundred percent liquid or solid solvent phase to be separated from the precipitated polyethylene by evaporation, or otherwise.

When the tile, following solvent removal, is heated to the softening temperature of the polyethylene, the particulate thermoplastic polyethylene is converted to a continuous film which coats the interior surface of the tile bisque, thereby rendering the interior surface resistant to water impregnation.

The concentration of polyethylene in the solution will depend on the extent of water repellancy desired in the treated tiles. In general, the polyethylene concentration of the solution should be at least about 4 percent by weight and preferably at least about 6 percent by weight. The upper limit of the concentration is not critical, and good results have been achieved with solutions containing 40 percent by weight of polyethylene, and even higher. The upper limit of the concentration is determined in part by the fact that with very high concentrations of polyethylene, the viscosity of the solution would preclude or excessively retard entry of the solution into the pores of the bisque. Of course, to overcome this problem, high boiling solvents and therefore high temperature applications of the solution could be employed. This, however, would not be as convenient as working with lower temperatures.

As indicated hereinabove, the temperature of the solution of polyethylene to be applied to the tile bisque should be above the cloud point of the polyethylene, usually higher than 70° C., and preferably as high as or higher than about 90° C. The temperature of the solution at application should also be above the melting point of the solvent employed. Otherwise, as will be obvious, a liquid solution of the polyethylene in the solvent would not be possible. Although the solution is usually applied at atmospheric pressure, pressures above or below atmospheric may be used, depending on the particular solvent used, as has been indicated hereinabove.

Following replacement of the air in the voids of the bisque with polyethylene solution, the tile is cooled to a temperature below the cloud point of the polyethylene to precipitate particles of the polyethylene in the voids of the bisque. Usually the tile is cooled to below 65° to 70° C.

In cooling the tile to below the cloud point of the polyethylene, care should be exercised to avoid premature evaporation of the solvent before precipitation of the polyethylene has occurred. Premature evaporation may be prevented by cooling under pressure or by sealing off the tile from the atmosphere during cooling.

Following cooling, the solvent, which may be solid or liquid at the temperature to which the tile has been cooled, is removed, as by free evaporation, forced air evaporation, evaporation in vacuum, and so forth. The method of solvent removal is not critical, and methods other than those indicated will be obvious to those skilled in the art. It is important in removing the solvent, however, to insure that the temperature of the tile is not raised above the cloud point of the polyethylene. Otherwise, the precipitated polyethylene would have a tendency to go back into solution in the solvent and to be carried away therewith.

Following evaporation or removal of the solvent, the tile is then heated to a temperature at or above the softening point of the polyethylene, usually above about 100° C. This final heating step converts the particulate polyethylene to a continuous hydrophobic film which coats the interior surface of the bisque. This final heating step is important for good results, as will be clear from the examples.

The following examples are illustrative of procedures used but are not intended to limit the scope of the invention except as such limitations may appear in the claims.

*Example 1*

Two weight parts of polyethylene are dissolved in eighteen weight parts of napthalene, the latter having been first melted and maintained at a temperature of 125° C. The polyethylene used has an average molecular weight of 2,000, an ASTM E28–51T melting range of 104° to 108° C., a specific gravity of 0.92 gram/ml., and a viscosity, at 140° C., of 180 centipoises.

A 4¼″ x 4¼″ glazed-on-one-face, ceramic tile, having a water-absorption value of 12.4 percent is also preheated to 125° C. and the heated polyethylene solution is poured onto the back, unglazed side of the tile until no more solution is imbibed. The tile, originally weighing 168 grams, is then noted to have imbibed 12 grams of the solution. Following this impregnation of the tile pores, the tile is allowed to cool to 70° C. in order to solidify the napthalene, and the napthalene is then sublimed off under vacuum. When all the napthalene has been thus removed the tile is cooled to room temperature, cut into two pieces, noted here as A and B. Piece B is placed in an oven at 104° C. for 2 hours. Piece A is not subjected to the heat treatment. Upon immersion in water for 72 hours, piece A, which has not been subjected to the final heating operation, imbibes 9.3 grams of water, while piece B imbibes only 2.6 grams of water. A completely untreated, control piece of tile of the same weight as these two halves imbibes 10.4 grams of water.

*Example 2*

A ten percent solution of polyethylene, in toluene, at 100° C. is poured onto the back of a ceramic tile, preheated to 100° C. The tile and polyethylene used are the same as described in Example 1. The tile, originally weighing 168.5 grams, shows a weight gain of 9.5 grams. The tile is then immediately cooled to room temperature, i.e., about 30° C., and allowed to dry by evaporation of the toluene into the air. Approximately 24 hours is required for complete loss of the toluene. One-half piece of this tile (B) is then heated at 108° C., for 3 hours, and the other half (A) is not heat treated. Upon immersion in water for 72 hours, piece A shows a weight gain of 10.0 grams, and pice B a weight gain of 3.0 grams.

*Example 3*

A ten percent mixture of polyethylene in xylene is heated to 90° C. to dissolve the polyethylene. The polyethylene has an average molecular weight of about 5,000, an ASTM E28–51T melting range of 107° to 111° C., a specific gravity of 0.92, and a viscosity, at 140° C., of 4,000 centipoises. Several tiles of the type described in Example 1 are preheated to 90° C., and then immersed in the heated polyethylene solution for 30 minutes. Upon removal from the solution, the tiles are immediately placed in a closed metal box and allowed to cool for about 15 minutes to a temperature slightly above room temperature, i.e., about 30° to 35° C. The purpose of the enclosure during this cooling period is to avoid premature evaporation of the liquid solvent (xylene) before precipitation of the polyethylene has occurred within the tile pores. Following cooling, the xylene is evaporated by placing the tiles in a vented circulating oven at 50° C. for 24 hours. The tiles are then heated to 108° C. and held at this temperature for 2 hours. Weight gain of the tiles, after 72 hours water immersion, is 0.0 gram.

*Example 4*

Example 3 is repeated, but with toluene replacing xylene as the solvent. The same results are obtained, no water imbibition by the treated tiles being noted after 72 hours immersion in water.

*Example 5*

Example 4 is repeated using a six percent solution of polyethylene in toluene. After 72 hours water immersion, the treated tiles are found to have imbibed only about 0.2 gram of water.

*Example 6*

Example 4 is repeated using a three percent solution of polyethylene in toluene. After 72 hours water immersion, the treated tiles are found to have imbibed about 20 grams of water.

*Example 7*

Example 4 is repeated using a one percent solution of polyethylene in toluene. After 72 hours water immersion, the treated tiles are found to have imbibed about 21 grams of water.

In Examples 3, 4, 5, 6, 7, full size, uncut 4¼″ x 4¼″ treated tiles were immersed in water. The amounts of water adsorbed by the tiles in Examples 6 and 7 is practically the same as for untreated tiles. Thus, use of less than a three percent solution of polyethylene appears ineffective as is clear from Examples 6 and 7. On the other hand, use of six percent and ten percent solutions give a very pronounced effect, as is clear from Examples 3, 4 and 5.

Example 8

Example 3 is repeated, but using a 30 percent solution of polyethylene in xylene. The polyethylene solution and tiles to be treated are heated to a temperature of 120° C., rather than 90° C. After 72 hours water immersion, the treated tiles are found to have imbibed no water.

Example 9

Example 4 is repated, with the exception that gypsum wall board rather than ceramic tile is treated. Similar results are obtained.

Ceramic tiles treated in accordance with the present invention may be readily installed on walls, floors, and the like with conventional grouts and mortars. The bonding characteristics of the treated tile compare favorably with those of untreated ceramic tile. Examples of suitable grouts and mortars are hydraulic cement containing compositions and resinous adhesive polymer or co-polymer containing compositions, such as epoxy resin and polyester resin containing compositions, and the like. The nature of such grouts and mortars is well understood in the art. When hydraulic cement compositions are used, no special precautions need be taken to insure against water loss for the reason that the polyethylene coating effectively prevents water imbibition by the tile. Thus, contrary to ordinary ceramic tiles, the treated tiles disclosed herein may be readily installed, for example, over hydraulic cement scratch and float without the necessity of water soaking the tiles and substrata prior to installation. This of course, leads to economic installation of tiles, and permits hydraulic cement mortars and grouts to be employed at job sites from which they were heretofore barred for obvious reasons connected with the necessity of soaking and wetting down the tiles and substrata.

If desired, the bond surface or backing of the treated tiles disclosed herein may be further treated, as by light abrasion and so forth to improve the bonding characteristics.

The invention in its broader aspects is not limited to the specific mechanisms shown and described but departures may be made therefrom within the scope of the accompanying claims without departing from the principles of the invention and without sacrificing its chief advantages.

What is claimed is:

1. A process for improving the resistance of porous masonry material against deterioration by freezing temperatures which comprises subjecting the masonry material to a liquid solution of polyethylene and a volatile solvent material capable of dissolving polyethylene, the liquid solution and masonry materials being maintained at a temperature in excess of the cloud point of polyethylene, cooling the material below the cloud point of polyethylene, removing the solvent while maintaining the temperature of the masonry material below the cloud point of polyethylene, and then heating the masonry material above the softening point of polyethylene.

2. The process of claim 1 wherein the porous masonry material is ceramic tile.

3. The process of claim 1 wherein the temperature of the liquid polyethylene solution and masonry is maintained at least in excess of the cloud point of polyethylene until no more solution is imbibed by the masonry material.

4. A process for improving the resistance of porous masonry material against deterioration by freezing temperatures which comprises subjecting the masonry material to a liquid solution of polyethylene and a volatile solvent material of the class consisting of hydrocarbons capable of dissolving polyethylene, the solution containing at least about 4 percent by weight of polyethylene, the solution and masonry material being maintained at a temperature at least in excess of the cloud point of polyethylene until no more solution is imbibed by the masonry material, cooling the material below the cloud point of polyethylene without allowing premature evaporation of the solvent, removing the solvent while maintaining the temperature of the masonry material below the cloud point of polyethylene, and then heating the masonry material above the softening point of polyethylene.

5. A process for improving the resistance of porous masonry material against deterioration by freezing which comprises subjecting the masonry material to a liquid solution of polyethylene, the polyethylene having a melting point of at least about 104° C., and a viscosity at 140° C. of at least about 100 centipoises, and a volatile solvent material consisting of hydrocarbons capable of dissolving polyethylene, the concentration of polyethylene in said solution being at least about 6 percent by weight, the temperature of the solution and masonry material being maintained in excess of the cloud point of polyethylene until no more solution is imbibed by the masonry material, cooling the material to below the cloud point of polyethylene without allowing premature evaporation of the solvent, to precipitate particles of polyethylene in the pores of the masonry material, removing the solvent while maintaining the temperature of the masonry material below the cloud point of polyethylene, and then heating the material to the softening point of the polyethylene.

6. A process for improving the resistance of ceramic tile materials against deterioration by freezing temperatures which comprises subjecting the tile to a liquid solution of polyethylene and a solvent of the class consisting of hydrocarbons capable of dissolving polyethylene, maintaining the materials at a temperature above the cloud point of polyethylene until no more solution is imbibed by the ceramic tile, cooling the tile to a temperature below the cloud point of polyethylene while substantially preventing evaporation of the solvent to precipitate polyethylene in the pores of the tile bisque, removing the solvent while maintaining the temperature of the tile below the cloud point of polyethylene, and heating the tile above the softening point of polyethylene.

7. The process of claim 6 wherein the concentration of polyethylene in the solution is at least about 6 percent by weight.

References Cited in the file of this patent
UNITED STATES PATENTS

| | | |
|---|---|---|
| 2,429,861 | Woodbridge | Oct. 28, 1947 |
| 3,007,812 | Smith | Nov. 7, 1961 |

OTHER REFERENCES

Kresser, T. O. J., "Polyethylene," Reinhold Plastics Applications Series, Reinhold Pub. Corp., New York, N.Y., 1957, pp. 135 to 138.